(12) United States Patent
Densham et al.

(10) Patent No.: US 11,599,257 B2
(45) Date of Patent: Mar. 7, 2023

(54) ELECTRONIC TRACKING DEVICE AND CHARGING APPARATUS

(71) Applicant: CAST Group of Companies Inc., Toronto (CA)

(72) Inventors: Gilray Densham, Inglewood (CA); Andrew Gordon, Toronto (CA); Aaron Densham, Etobicoke (CA)

(73) Assignee: CAST GROUP OF COMPANIES INC., Toronto (CA)

( * ) Notice: Subject to any disclaimer, the term of this patent is extended or adjusted under 35 U.S.C. 154(b) by 0 days.

(21) Appl. No.: 17/095,311

(22) Filed: Nov. 11, 2020

(65) Prior Publication Data

US 2021/0141520 A1    May 13, 2021

Related U.S. Application Data

(60) Provisional application No. 62/934,215, filed on Nov. 12, 2019.

(51) Int. Cl.
   *G06F 3/04847*   (2022.01)
   *G06F 3/04883*   (2022.01)
   (Continued)

(52) U.S. Cl.
   CPC ...... *G06F 3/04847* (2013.01); *G06F 3/04883* (2013.01); *G08C 23/04* (2013.01); *G09G 3/344* (2013.01); *H02J 7/0013* (2013.01); *H02J 7/00032* (2020.01); *H02J 7/0045* (2013.01); *H02J 7/0047* (2013.01); *H04N 5/2224* (2013.01); *G06F 3/0482* (2013.01); *G06F 3/0486* (2013.01); *G09G 2354/00* (2013.01)

(58) Field of Classification Search
   CPC ...... G06F 3/04847; G06F 1/163; G06F 3/011; G06F 3/0304; G06F 3/0325; G06F 3/04883; G06F 3/0482; G06F 3/0486; G06F 1/1632; G08C 23/04; H04N 5/2224; G09G 3/344; G09G 2354/00; H02J 7/00032; H02J 7/0013; H02J 7/0045; H02J 7/0047; H02J 7/00034; H02J 7/0044
   See application file for complete search history.

(56) References Cited

U.S. PATENT DOCUMENTS 4,542,291 A * 9/1985 Zimmerman ...... G01D 5/35345
                                                    250/551
4,631,676 A * 12/1986 Pugh .................... A61B 5/1038
                                                    600/595

(Continued)

OTHER PUBLICATIONS

"BlackTrax Wiki—History:BTBeacon—Preview of version 9"; CAST Group of Companies Inc.; retrieved Aug. 5, 2021; published Feb. 24, 2016; URL:<http://wiki.blacktrax.ca/tiki-pagehistory.php?page=BTBeacon&preview=99>.

(Continued)

*Primary Examiner* — Benyam Ketema
(74) *Attorney, Agent, or Firm* — Wilfred P. So

(57) ABSTRACT

Managing multiple devices, such as tracking beacons, is challenging, especially as the number of beacons increases. A beacon and a charging station are provided for managing the settings of the beacons. The beacon includes a display with a graphical user interface (GUI) for updating settings. The charging station includes charging ports and a display with a GUI for updating beacon settings.

14 Claims, 16 Drawing Sheets

(51) Int. Cl.
*G09G 3/34* (2006.01)
*G08C 23/04* (2006.01)
*H04N 5/222* (2006.01)
*H02J 7/00* (2006.01)
*G06F 3/0486* (2013.01)
*G06F 3/0482* (2013.01)

(56) References Cited

U.S. PATENT DOCUMENTS

| | | | | |
|---|---|---|---|---|
| 4,665,928 A * | 5/1987 | Linial | A61B 5/1121 | 600/595 |
| 4,988,981 A * | 1/1991 | Zimmerman | A61B 5/1127 | 434/45 |
| 5,229,756 A * | 7/1993 | Kosugi | A63F 13/428 | 463/36 |
| 5,372,365 A * | 12/1994 | McTeigue | A63B 69/3608 | 473/202 |
| 5,429,140 A * | 7/1995 | Burdea | A63B 21/008 | 600/587 |
| 5,524,637 A * | 6/1996 | Erickson | A61B 5/222 | 600/592 |
| 5,583,478 A * | 12/1996 | Renzi | G06F 3/014 | 340/407.1 |
| 5,638,300 A * | 6/1997 | Johnson | A63B 24/0003 | 473/223 |
| 5,641,288 A * | 6/1997 | Zaenglein, Jr. | F41G 3/2633 | 434/21 |
| 5,790,076 A * | 8/1998 | Sypniewski | G01S 5/14 | 342/465 |
| 5,826,578 A * | 10/1998 | Curchod | A63B 69/0059 | 600/595 |
| 5,844,824 A * | 12/1998 | Newman | G06F 1/163 | 345/156 |
| 5,846,086 A * | 12/1998 | Bizzi | A63B 71/0622 | 482/902 |
| 5,913,727 A * | 6/1999 | Ahdoot | G06F 3/011 | 463/40 |
| 5,914,701 A * | 6/1999 | Gersheneld | G06F 3/017 | 340/13.31 |
| 5,930,741 A * | 7/1999 | Kramer | G06F 3/011 | 340/573.7 |
| 5,963,891 A * | 10/1999 | Walker | G06F 3/011 | 73/379.03 |
| 6,005,548 A * | 12/1999 | Latypov | A63F 13/42 | 345/473 |
| 6,097,369 A * | 8/2000 | Wambach | G06F 3/014 | 345/157 |
| 6,353,932 B2 * | 3/2002 | Stembridge | A41D 13/0015 | 463/8 |
| 6,512,947 B2 * | 1/2003 | Bartholome | A61B 5/6831 | 600/509 |
| 6,597,443 B2 * | 7/2003 | Boman | G01B 11/22 | 356/141.5 |
| 6,691,074 B1 * | 2/2004 | Moriya | G06T 7/277 | 702/190 |
| 6,701,296 B1 * | 3/2004 | Kramer | G06F 1/163 | 370/545 |
| 6,710,713 B1 * | 3/2004 | Russo | A63B 24/0021 | 348/157 |
| 6,757,068 B2 * | 6/2004 | Foxlin | G06F 3/0421 | 356/139.03 |
| 6,909,420 B1 * | 6/2005 | Nicolas | G06F 1/163 | 345/181 |
| 6,984,208 B2 * | 1/2006 | Zheng | A61B 5/1107 | 600/595 |
| 7,046,151 B2 * | 5/2006 | Dundon | G06F 3/011 | 340/407.1 |
| 7,292,151 B2 * | 11/2007 | Ferguson | A63B 24/0003 | 340/407.1 |
| 7,331,871 B2 * | 2/2008 | Lopez | A63F 13/212 | 463/47 |
| 7,602,301 B1 * | 10/2009 | Stirling | A63B 69/3608 | 340/573.7 |
| 7,698,830 B2 * | 4/2010 | Townsend | A61B 5/4561 | 482/8 |
| 7,712,365 B1 * | 5/2010 | James | A61B 5/6828 | 73/488 |
| 7,725,279 B2 * | 5/2010 | Luinge | B25J 9/1694 | 702/94 |
| 7,755,602 B2 * | 7/2010 | Tremblay | G06F 3/014 | 715/702 |
| 7,774,155 B2 * | 8/2010 | Sato | A63F 13/428 | 345/169 |
| 7,821,407 B2 * | 10/2010 | Shears | A63B 69/3608 | 73/379.01 |
| 7,980,141 B2 * | 7/2011 | Connor | A61B 5/1126 | 73/849 |
| 8,019,121 B2 * | 9/2011 | Marks | A63F 13/42 | 382/103 |
| 8,231,506 B2 * | 7/2012 | Molyneux | A43B 1/0054 | 482/901 |
| 8,323,106 B2 * | 12/2012 | Zalewski | A63F 13/06 | 463/31 |
| 8,328,691 B2 * | 12/2012 | Lanfermann | A63B 69/00 | 482/901 |
| 8,636,605 B2 * | 1/2014 | Rose | A63B 69/0002 | 473/266 |
| 8,639,666 B2 | 1/2014 | Densham et al. | | |
| 8,854,594 B2 * | 10/2014 | Densham | H04N 7/181 | 348/169 |
| 8,938,431 B2 | 1/2015 | Densham et al. | | |
| 9,055,226 B2 | 6/2015 | Densham et al. | | |
| 9,177,387 B2 * | 11/2015 | Marks | G06T 7/246 | |
| 9,350,923 B2 | 5/2016 | Densham et al. | | |
| 9,538,156 B2 | 1/2017 | Densham et al. | | |
| 9,573,056 B2 * | 2/2017 | Marks | A63F 13/02 | |
| 9,582,072 B2 * | 2/2017 | Connor | A61B 5/6804 | |
| 9,747,697 B2 | 8/2017 | Densham et al. | | |
| 9,822,956 B2 | 11/2017 | Eichel | | |
| 9,823,634 B2 | 11/2017 | Densham et al. | | |
| 10,279,254 B2 * | 5/2019 | Mikhailov | G06F 3/0304 | |
| 10,437,658 B2 * | 10/2019 | Alonso | G09B 19/0038 | |
| 10,455,874 B2 * | 10/2019 | Okumiya | A41D 19/0027 | |
| 2002/0036617 A1 * | 3/2002 | Pryor | G06F 3/0425 | 345/156 |
| 2003/0014212 A1 * | 1/2003 | Ralston | H04N 13/366 | 348/E13.059 |
| 2004/0143176 A1 * | 7/2004 | Foxlin | G01S 11/16 | 600/395 |
| 2004/0219498 A1 * | 11/2004 | Davidson | A63B 69/00 | 434/247 |
| 2007/0021208 A1 * | 1/2007 | Mao | A63F 13/06 | 463/36 |
| 2007/0250286 A1 * | 10/2007 | Duncan | A63B 23/0244 | 702/139 |
| 2010/0105475 A1 * | 4/2010 | Mikhailov | A63F 13/24 | 463/33 |
| 2010/0164862 A1 * | 7/2010 | Sullivan | G06T 7/73 | 345/156 |
| 2012/0025945 A1 * | 2/2012 | Yazadi | H04L 67/75 | 2/160 |
| 2012/0050535 A1 * | 3/2012 | Densham | H04N 7/181 | 348/E7.085 |
| 2012/0143093 A1 * | 6/2012 | Stirling | A63B 24/0062 | 600/595 |
| 2017/0140617 A1 * | 5/2017 | Klein | G08B 6/00 | |
| 2018/0196585 A1 | 7/2018 | Densham et al. | | |
| 2019/0138107 A1 * | 5/2019 | Nietfeld | G06F 3/0346 | |
| 2019/0280535 A1 * | 9/2019 | Tu | H02J 50/40 | |
| 2020/0363490 A1 * | 11/2020 | Densham | G01S 5/16 | |
| 2021/0042019 A1 * | 2/2021 | Densham | H05B 47/125 | |

OTHER PUBLICATIONS

"BlackTrax Wiki—History:BTSmart Charger—Preview of version 12"; CAST Group of Companies Inc.; retrieved Aug. 5, 2021; published Apr. 15, 2019; URL:<http://wiki.blacktrax.ca/tiki-pagehistory.php?page=BTSmart+Charger&preview=12>.

(56) References Cited

OTHER PUBLICATIONS

"BlackTrax Unveils Version 2.2"; Lighting And Sound America; retrieved Aug. 5, 2021; published Oct. 16, 2017; URL:<http://www.lightingandsoundamerica.com/news/story.asp?ID=4UP6S>.

* cited by examiner

ELECTRONIC TRACKING DEVICE AND CHARGING APPARATUS

CROSS-REFERENCE TO RELATED APPLICATION

This patent application claims priority to U.S. patent application Ser. No. 62/934,215, titled "Electronic Tracking Device And Charging Apparatus", filed on Nov. 12, 2019, the entire contents of which are herein incorporated by reference.

TECHNICAL FIELD

The following generally relates to an electronic tracking device and charging apparatus.

DESCRIPTION OF THE RELATED ART

Tracking objects in a physical space can be difficult, as people and things move freely and sometimes unexpectedly. Electronic tracking devices can be put on people and things. These tracking devices require an apparatus to provide an electrical charge.

BRIEF DESCRIPTION OF THE DRAWINGS

Embodiments will now be described by way of example only with reference to the appended drawings wherein:

FIG. 3b is a bottom perspective view of the beacon shown in FIG. 3a.

FIG. 3c is a rear perspective view of the beacon shown in FIG. 3a.

DETAILED DESCRIPTION

Figure 1:
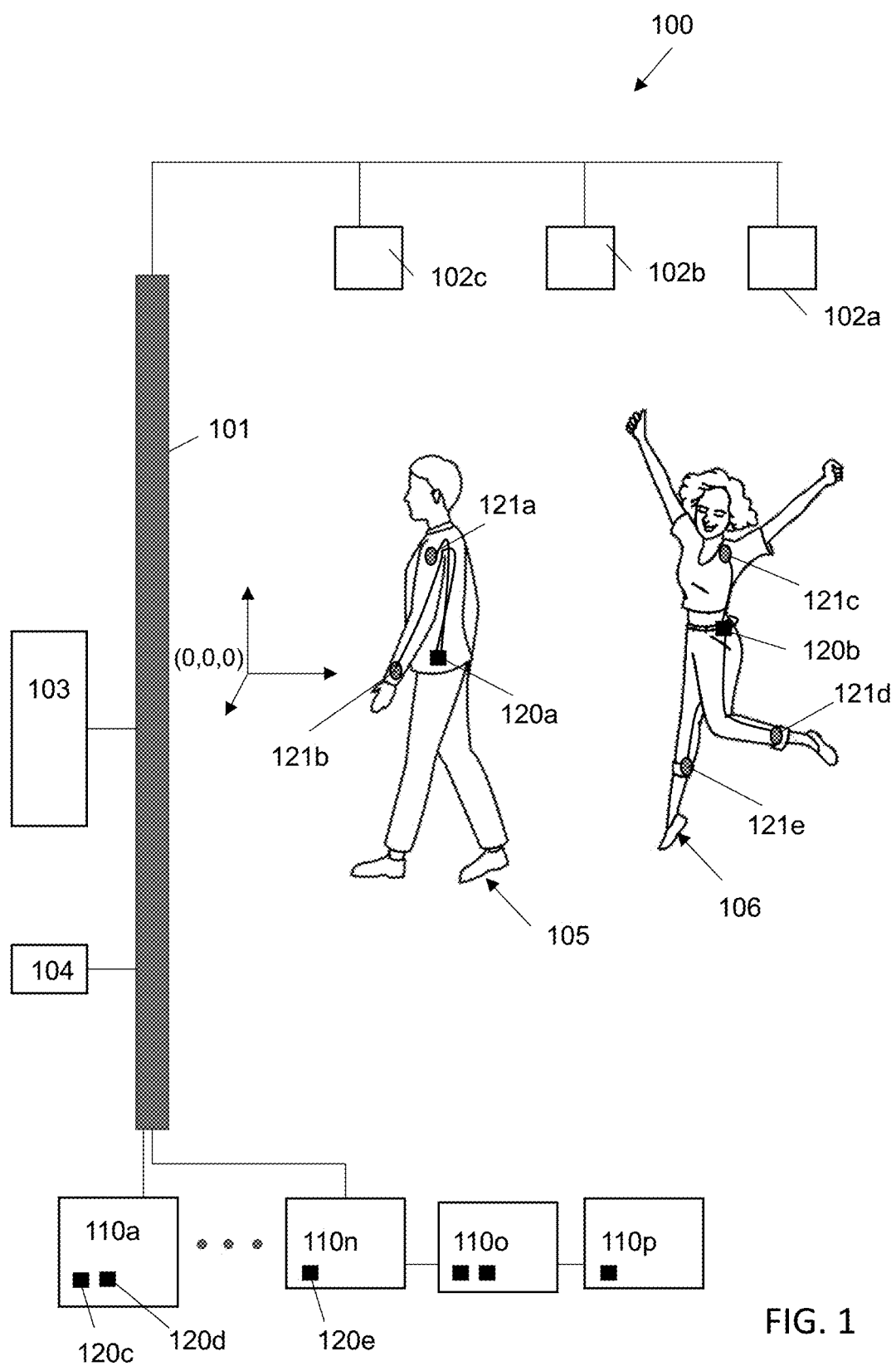
FIG. 1 is a schematic diagram of a tracking system that tracks the position of electronic tracking devices, herein called beacons.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

FIG. 1 shows a tracking system 100 that tracks the position and movement of one or more tracking beacons 120a, 120b (also herein called beacons) and their respectively connected light sources 121a, 121b, 121c, 121d, 121e. These light sources are more generally referenced with reference numeral 121. A person 105 has on their body a beacon 120a and several light sources 121a, 121b are connected to the beacon 120a via wires. Another person 106 has on their body a beacon 120b and several light sources 121c, 121d, and 121e are connected to the beacon 120b via wires.

It will be appreciated that one beacon can be attached to one or more light sources.

The beacon controls the blinking pattern of each light emitting tracking device. The beacon includes, for example, a controller that controls one or more blinking patterns and a power source (e.g. a battery) to power the lights in the light emitting tracking device. The beacon, for example, also includes a wireless transceiver to wirelessly transmit and receive data.

In an example aspect the light source 121 emits light that is detected by one or more optical sensors 102a, 102b, 102c (e.g. cameras). Preferably, there are two or more optical sensors to track a light source in multiple dimensions (e.g. X, Y, Z dimensions). For example, the optical sensors 102a, 102b, 102c are positioned overhead and capture images of the light emitted from a given light source 120. The optical sensors transmit the captured video data and time code information via a data network 101. A tracking server 103, which is also connected to the data network 101, receives the captured video data from the optical sensors then processes the images using image recognition to identify the position of the light sources in the images. The position information from the different optical sensors are then compared (e.g. using triangulation) by the tracking server 103 to determine the location of a given beacon in three-dimensional space.

In an example aspect, the light sources emit infrared light and the optical sensors 102a, 102b, 102c detect the infrared light. In other words, the optical sensors are infrared cameras. In an alternative embodiment, a light in a different range of the light spectrum is emitted and is detected by the optical sensors 102a, 102b, 102c.

In an example aspect, a light source is an infrared light emitting diode (LED). The infrared light is not visible to people's eyes, but can be detected by the optical sensors.

In an example embodiment, each of the light sources 121a, 121b, 121c, 121d, 121e emit light at a different blinking pattern or blinking frequency. The blinking pattern or the blinking frequency represents an identifier (ID) that is specific to each light source, and is mapped to a specific beacon. In other words, the light source 121*a* has a first ID and accordingly blinks according to a first blinking pattern or blinking frequency that is associated with the first ID, and the light source 121*b* has a second ID and accordingly blinks according to a second blinking pattern or blinking frequency that is associated with the second ID. These blinking patterns or blinking frequencies are controlled by the beacon 120*a* to which the light emitting tracking device is connected.

In other words, over a series of images, the tracking server 103 can detect the blinking pattern of a given light source to identify its associated ID. In this way, the tracking server can track the position and movement of multiple light sources simultaneously.

Furthermore, the beacon 120*a* also includes an inertial measurement unit (IMU) and other sensors that measure the relative position and orientation of the beacon 120*a*. This inertial information is sent to the tracking server 103, and this inertial information combined with the optical positioning information provides a robust and accurate tracking system for position or orientation, or both. It will be appreciated that different computations can be used to merge the sensor data from the IMU of the beacon and the sensor data from the optical sensors.

In an example embodiment, the data network 101 is a network switch. In a further example embodiment, the data network 101 is an Ethernet network.

In an example aspect, a time keeper device 104 is connected to the data network 101 to synchronize other devices that are connected to the data network, such as the optical sensors 102*a*, 102*b*, 102*c*, the tracking server 103 and one or more charging stations 110*a*, 110*n*, 110*o*, 110*p*. Other devices in the system 100 may have their own time keeping devices.

One or more charging stations 110*a*, 110*n*, 110*o*, 110*p* have charge ports that hold beacons 120*c*, 120*d*, 120*e* and more for providing electrical charging as well as beacon setting management.

In an example embodiment, a given charging station 110*n* is connected to the data network 101 via wired connection, and one or more other charging stations 110*o* and 110*p* are connected to the given charging station 110*n* in a daisy chain manner. For example, the charging station 110*o* is connected via a wire to the charging station 110*n*, and the charging station 110*p* is connected via a wire to the charging station 110*o*. In this way, these daisy chained charging stations 110*o* and 110*p* are also in data communication with the data network 101.

In an example embodiment, data from the beacons 120*a*, 120*b*, etc. are transmitted to the one or more charging stations 110*a*, 110*n*, etc. so that current data from the beacons can be displayed by one or more of the charging stations. For example, battery data about a given beacon is wirelessly transmitted to a given charging station, and a display device on the charging station displays this battery data.

In another example embodiment, data from a given charging station is transmitted to one or more beacons. This data can be used to affect the operation of the beacon (e.g. modify blinking settings for the light source, display a message, display an indicator, change a sensor mode, etc.). For example, a charging station wirelessly transmits data to a beacon and, after receiving this data, the beacon is triggered to display a message or an indicator to return the beacon to the charging station. In another example, a charging station wirelessly transmits data to a beacon and, after receiving this data, the beacon is triggered to activate a blinking light source at a higher brightness level or a lower brightness level.

More generally, according to an example embodiment, data is communicated between one or more beacons and one or more charging stations over the data network 101.

In an example embodiment, the system of devices and components shown in FIG. 1 can be provided as one or more kits of parts. For example, a kit includes the tracking beacons, the infrared light sources and one or more of the charging stations. The number of tracking beacons, the number of infrared light sources and the number of charging stations are selected for the application (e.g. the number of people or objects to be tracked).

Figure 2A:
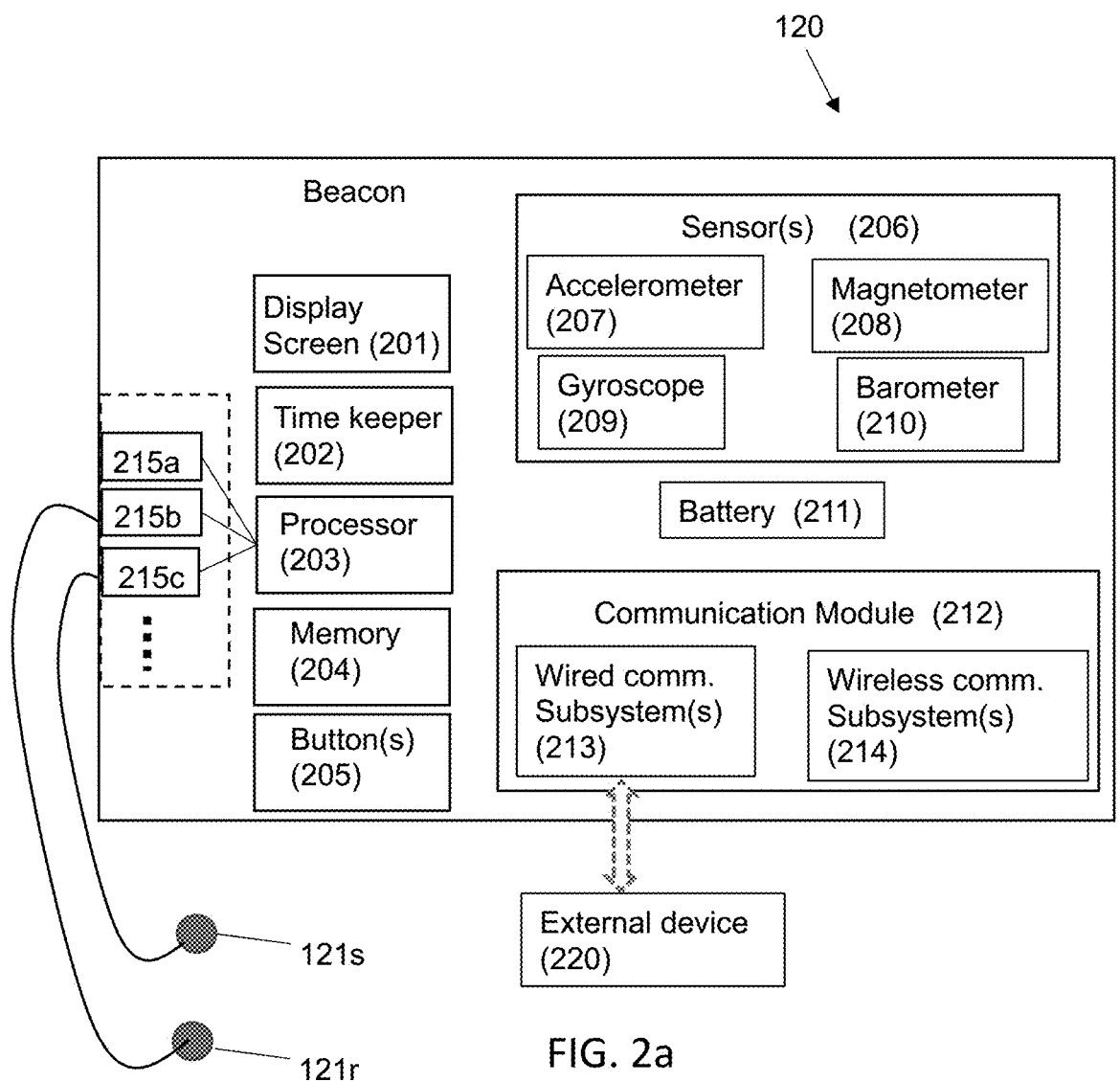
FIG. 2a is a schematic diagram of a beacon according to an example embodiment.

FIG. 2*a* shows example components of a beacon 120. It includes one or more ports 215*a*, 215*b*, 251*c* that each connect to a wire with a light source (e.g. LED). For example, the light source 121*s* is controlled by the signal from the port 215*c* and the light source 121*r* is controlled by the signal from the port 215*b*. The signal provided to each port 215*a*, 215*b*, 215*c* is individually controlled by an onboard processor 203. For example, the signal is a blinking or flashing pattern. The beacon also includes a display screen 201, a time keeper 202, memory 204, one or more buttons 205, one or more sensors 206, a battery 211 and a communication module 212. The sensors 206 include one or more sensors, and examples of sensors include an accelerometer 207, a gyroscope 209, a magnetometer 208 and a barometer 210. For example, the accelerometer, the gyroscope and the magnetometer are integrated into a 9-way IMU. It will be appreciated that different types of sensors can be used in the beacon. The communication module 212 includes one or more wired communication subsystems 213 (e.g. a universal serial bus (USB) connector or some other type of currently-known or future-known physical connector) and one or more wireless communication subsystems 214 (e.g. WiFi, Bluetooth, or some other type of currently-known or future-known wireless communication). An example format of a USB connector is the USB-C connector.

In an example embodiment, the display screen 201 is an electronic paper display (EPD), which uses electronic ink to display images or text, or both. This type of display consumes very little energy. For example, little or no electrical energy is used to hold a static image or text on the display screen. It will be appreciated that other types of currently known and future known display screens can be incorporated into the beacon.

The data from the sensors is transmitted from the beacon to the tracking server 103 using the wireless communication subsystem, and the tracking server 103 uses this information to compute the position or orientation, or both, of the beacon. Information about the battery use, including remaining charge information (e.g. as a percentage or as time remaining, or both), is also transmitted using the wireless communication subsystem to one or more charging stations 110, so that the one or more charging stations can display remaining battery charge information for the given beacon.

The beacon ID or other settings, or both, can be configured on the beacon itself using the display screen and one or more buttons, and this information is also transmitted to the tracking server 103 or to the one or more charging stations 110, or to both.

The beacon also detects when a working light source is connected to a given port 215*a*, 215*b*, 215*c*, etc., and this information is displayed on the display screen 201. In this way, a user can visually discern if a light source connected to a port in the beacon is emitting light or not. It will be appreciated that when using an infrared light source (e.g. infrared LED), a user cannot see whether the light source is working by looking at the infrared light source. An indicator that is visible to the user, such as on the display screen 201, informs the user.

In another example embodiment, the visual indicator corresponding to each activated port (e.g. ports 215a, 215b, 215c, etc.) can also be positioned as a dedicated light indicator device on the beacon body. In another example embodiment, a light indicator device is integrated into the wire (e.g. positioned on the plug of the wire) of the light source (e.g. the infrared light sources 121s, 121r, etc.), and the light indicator device is activated when the attached given infrared light source is activated to pulse by the beacon.

The visual indicator device for indicating that a given port 215a, 215b, 215c, etc. is being activated to pulse a light source 121s, 121r, etc. can be integrated into the beacon in different ways or integrated into a corresponding wire in different ways. The visual indicator device is also herein referred to as a working indicator.

In another example aspect, the wired communication subsystem 213 allows the option for the beacon to connect to an external device 220. The external device 220 connects to the beacon to, for example, do one or more of the following: provide additional data to the beacon, to provide commands to the beacon, to provide additional power to the beacon, to obtain data from the beacon, to obtain power from the beacon, etc. In an example aspect, the external device 220 increases the operational capacity of the beacon, such as by sensing additional data and providing the additional data to the beacon. In another example, the external device 220 is an external mobile battery that provides further power to the beacon. In another example, the external device 220 includes long range wireless communication systems that increases the distance at which the beacon can receive or transmit, or both, data with the tracking server 103.

Figure 2B:
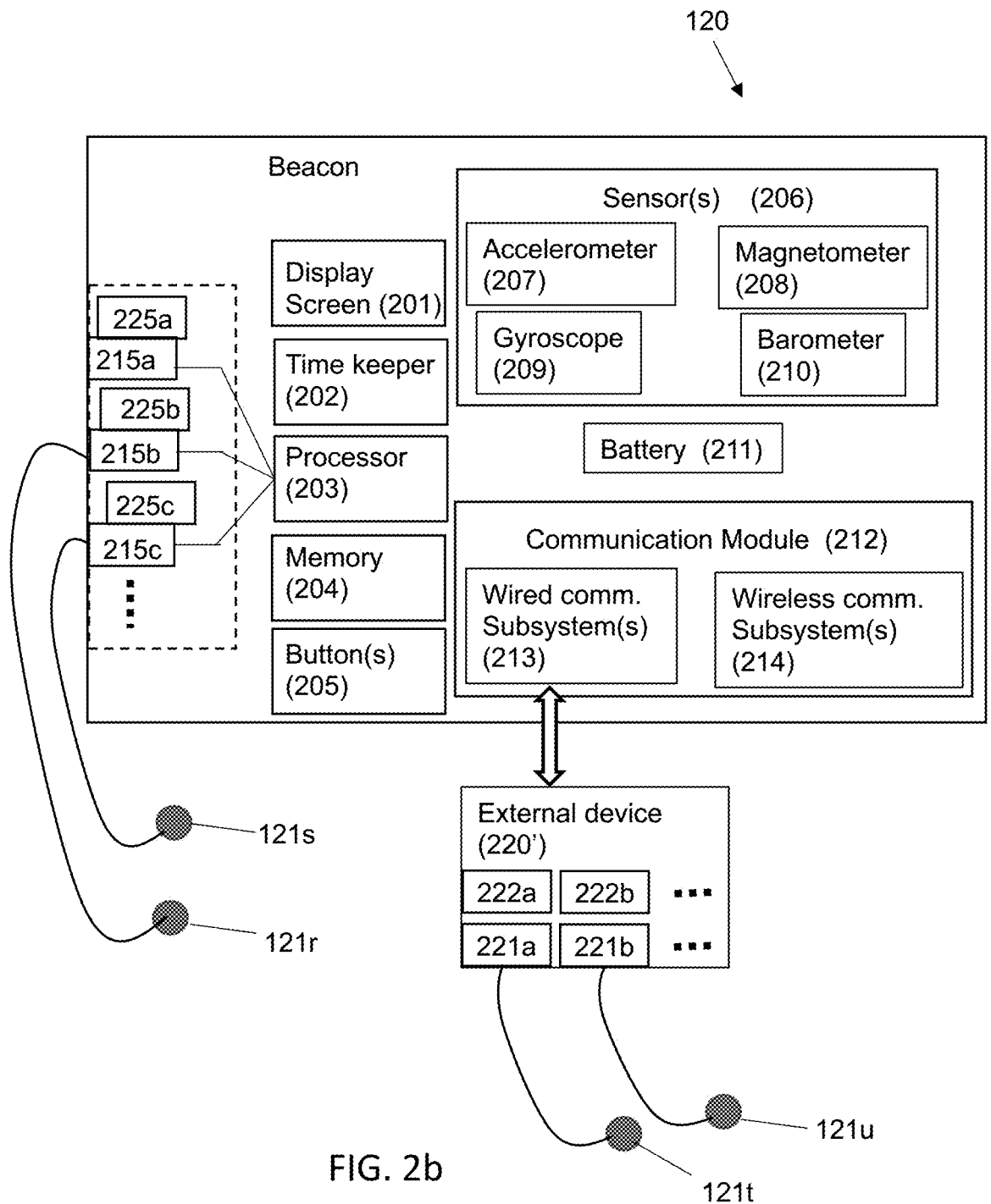
FIG. 2b is a schematic diagram of a beacon connected to an external device for increasing the number of connected light sources controlled by the beacon, according to an example embodiment.

In another example embodiment, shown in FIG. 2b, the external device 220' includes additional ports 221a, 221b, etc. to respectively connect to additional light sources 121t, 121u, etc. In other words, the beacon 120 controls more light sources via the external device 220'. The external device 220', for example, is considered an expansion port device. In an example aspect, the external device 220' further includes indicator devices 222a, 222b, etc. that respectively correspond to the additional ports 221a, 221b, etc. For example, when the port 221a is activated by the beacon 120 to pulse the light source 121t, then the indicator device 222a is activated. The indicator devices 222a, 222b, etc. for example emit light in the visual spectrum when activated or, for example, change color when activated, or both.

Also shown in FIG. 2b are indicator devices 225a, 225b, 225c on the beacon 120 that respectively correspond to the ports 215a, 215b, 215c. For example, when the port 215b is activated by the beacon 120 to pulse the light source 121r, then the indicator device 225b is activated. The indicator devices 225a, 225b, 225c emit light in the visual spectrum when activated or change color when activated, or both.

It will also be appreciated that data from the beacon can be read or written, or both, using the wired communication subsystem 213 when the beacon is physically connected to a charging station.

Figure 3A:
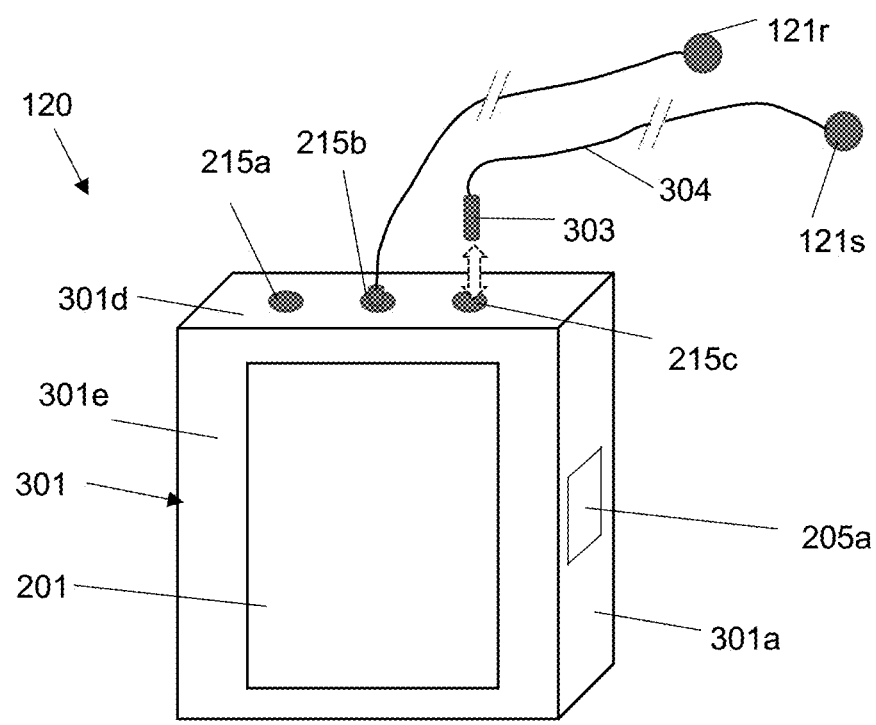
FIG. 3a is a front perspective view of a beacon according to an example embodiment.
Figure 3B:
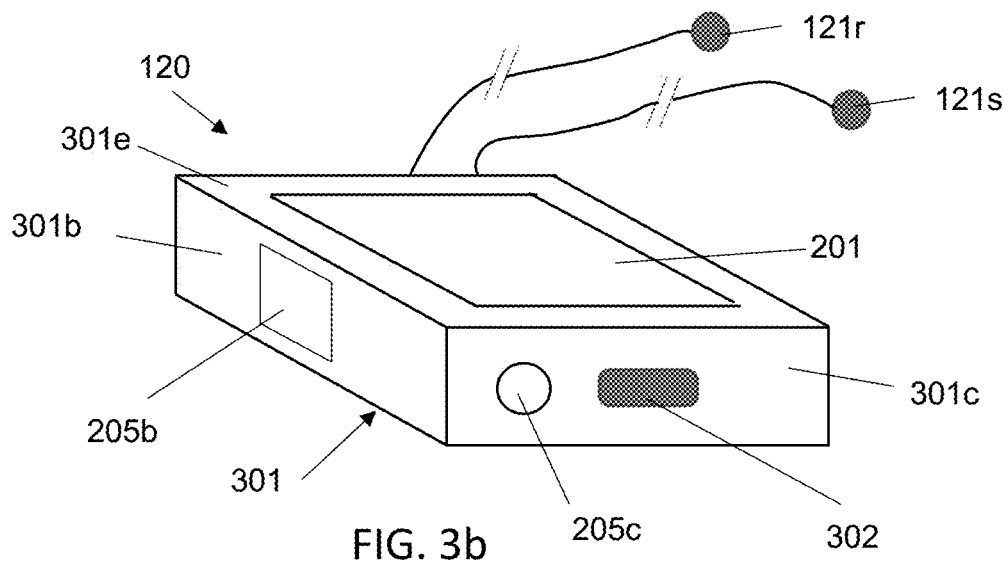
Figure 3C:
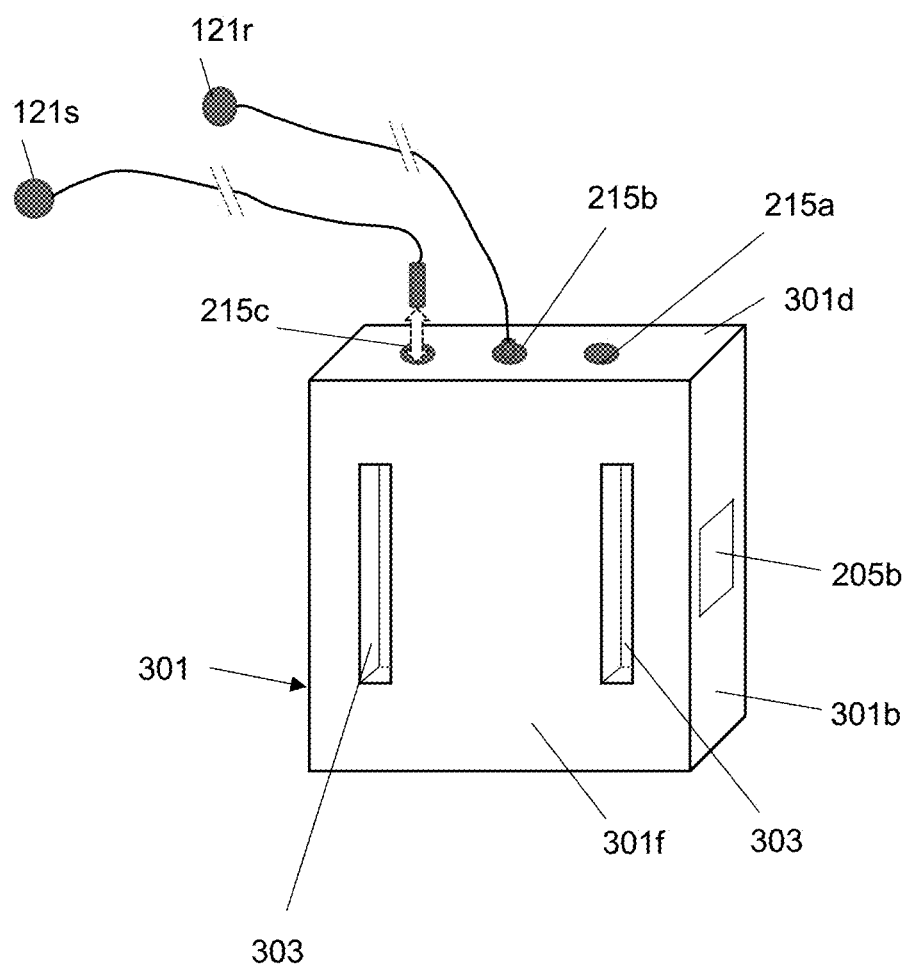

FIGS. 3a, 3b and 3c show different views of an example embodiment of a beacon 120. The housing 301 of the beacon includes two opposite side surfaces 301a, 301b that have respectively positioned thereon buttons 205a, 205b. The housing 301 also incudes a bottom surface 301c and an opposite facing top surface 301d. The terms "top" and "bottom" are arbitrarily used here as the orientation of the beacon can be changed in different scenarios. For example, when the beacon is placed in the charging station, the surface 301d faces upwards or away from the charging station. When using the graphical user interface (GUI) of the display screen, the surface 301c, for example, faces upwards.

The surface 301d has positioned thereon the one or more ports 215a, 215b, 215c for respectively connecting to the one or more wires with the light sources. For example, the light source 121s is connected to a wire 304 that connects to a plug 303. The plug 303 is received by a receptacle that is the port 215c. The plug and receptacle include together form a quick-connect and quick-disconnect mechanism. For example, this mechanism is a spring-loaded locking and unlocking mechanism. For example, in use, a user pushes the plug to unlock the plug from the receptacle, and pulls the plug in an opposite direction to lock the plug into the receptacle.

The surface 301c has positioned thereon a physical port 302 that connects to the wired communication subsystem 213 and to the battery 211. For example, the port 302 is a female connector according to a USB format. In an example implementation, the port 302 is a female USB-C connector. It will be appreciated that alternative types of data ports and power connectors can be used. The surface 301c also has positioned thereon another button 205c.

The number of buttons and positions of the buttons can vary from the embodiment shown.

The front surface 301e of the housing 301 has positioned thereon the display screen 201.

The rear surface 301f of the housing 301 includes one or more physical features 303 (e.g. indents or protrusions, or both) that allow for other mechanical devices to be connected to the rear surface 301f. For example, a clip can be connected to the rear surface 301f. In another example, a mounting pad is connected to the rear surface, so that the beacon is mountable onto another object.

Figure 4A:
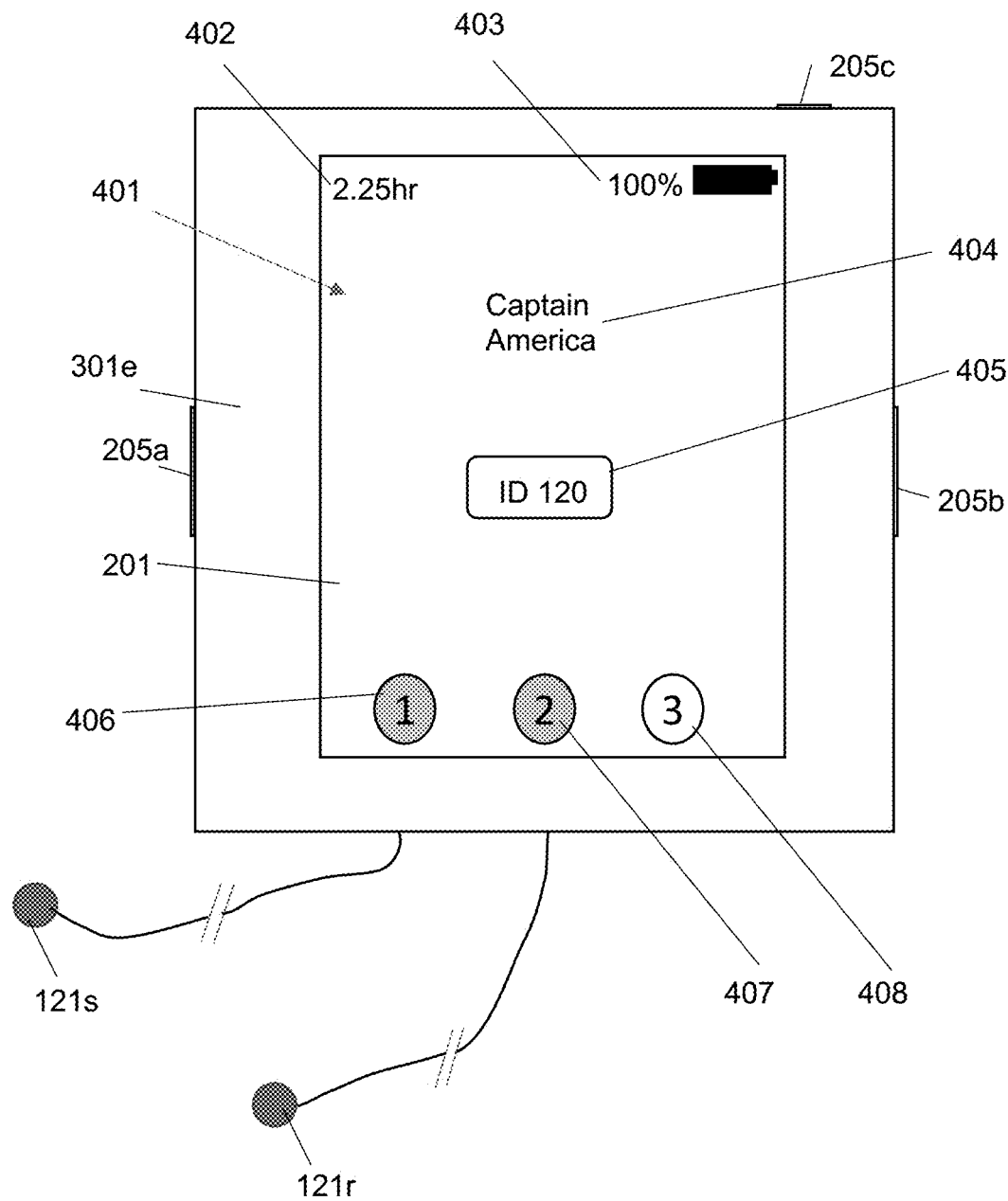
FIG. 4a is an example embodiment of a graphical user interface (GUI) showing a home screen on the beacon.

Turning to FIG. 4a, an example embodiment of a home screen GUI 401 is shown, which include the information: time remaining for battery life 402, percentage of battery charge remaining 403, the associated name of the beacon 404, the beacon ID 405, and an identification of the ports for the light sources 406, 406, 408. In this example, the identifications 406 and 407 are visually highlighted or visually marked to indicate that working light sources 121s and 121r are connected to the first and the second ports for the light sources.

In an example aspect, pressing one of the buttons 205a, 205b, 205c momentarily illuminates the display. In dark or low-light environments, this helps a user to see the GUIs displayed on the display.

Figure 4B:
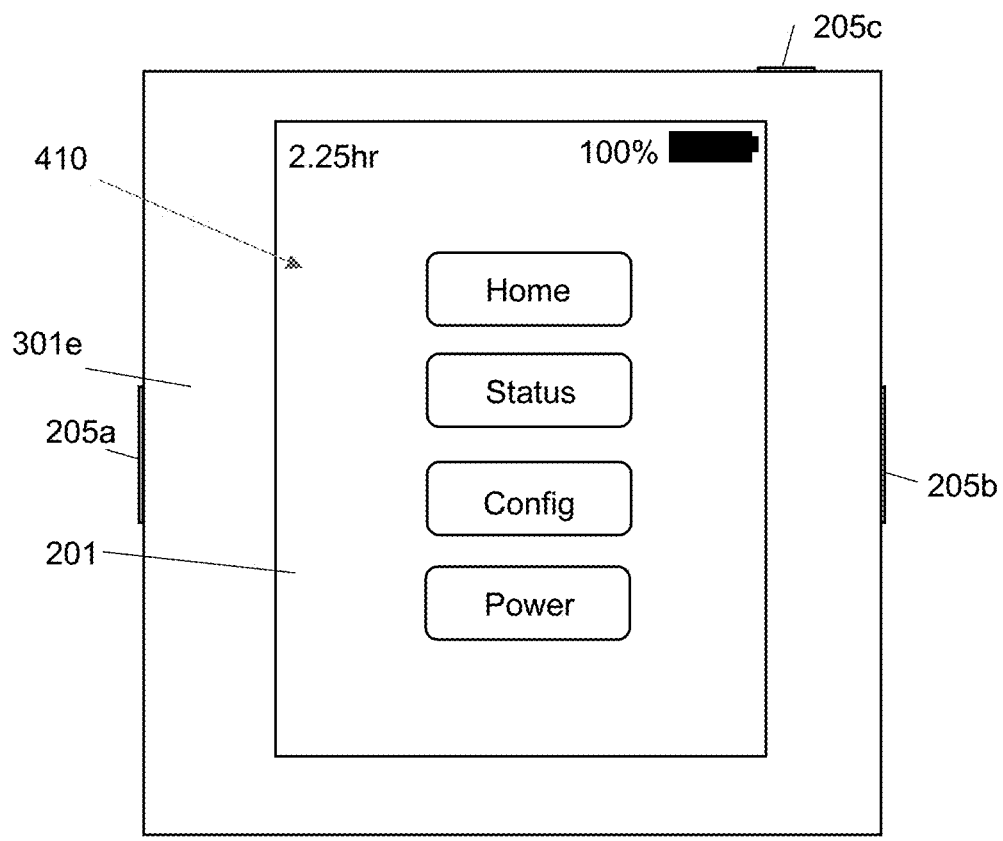
FIG. 4b is an example embodiment of a GUI showing a menu screen.

From the home screen, a user can press one of the buttons to navigate to the menu screen 410 shown in FIG. 4b. The menu has selectable options that include the home screen, a status screen, a configuration screen, and a power screen. The power screen, for example, shows a confirmation screen to power off the device. In an alternative example, the power screen shows information about the power usage of the beacon. The menu can be navigated through using one or more of the buttons.

Figure 4C:
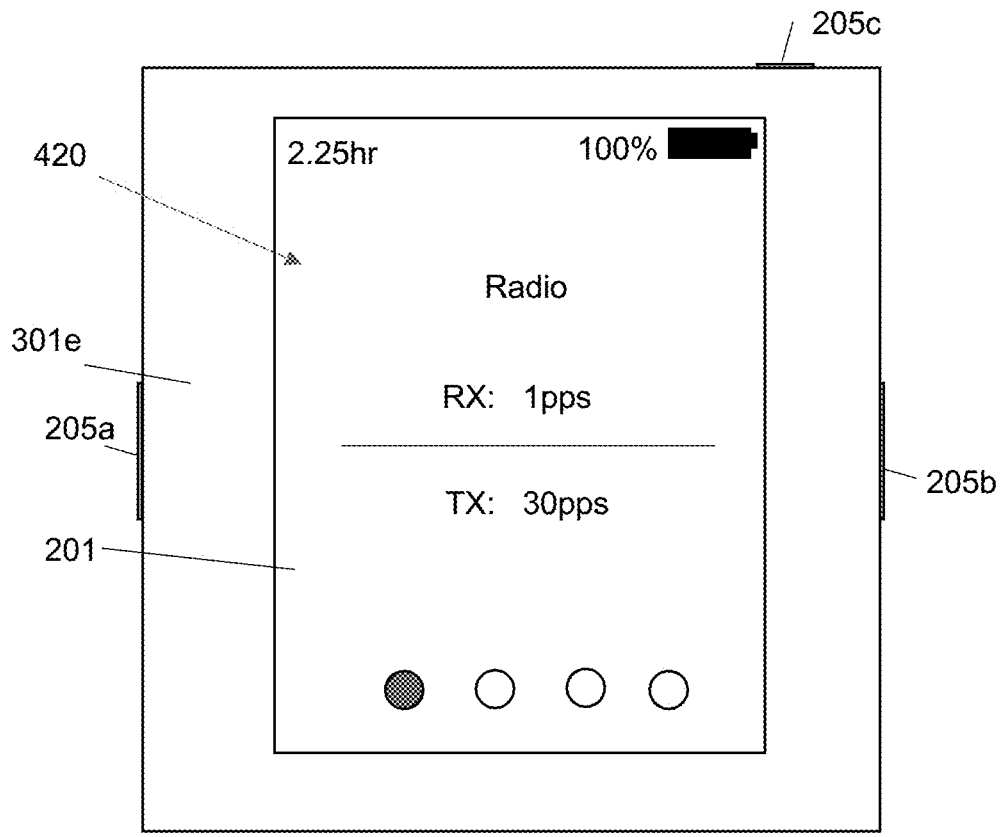
FIG. 4c is an example embodiment of a GUI showing a status screen.

After the status option is selected, the status screen is displayed. An example embodiment of a status screen 420 is shown in FIG. 4c. It includes various data about the beacon, such as, for example, radio information, brightness of the light source(s), beacon serial number, zones associated with the beacon, preset conditions or protocols, etc. In an example aspect, the status screen displays that radio packets are being sent and received, which helps a user confirm that the beacon is working.

After the configuration option is selected, one or more configuration options are provided to change a setting of the beacon, or to change an ID of the beacon, or both.

Figure 4D:
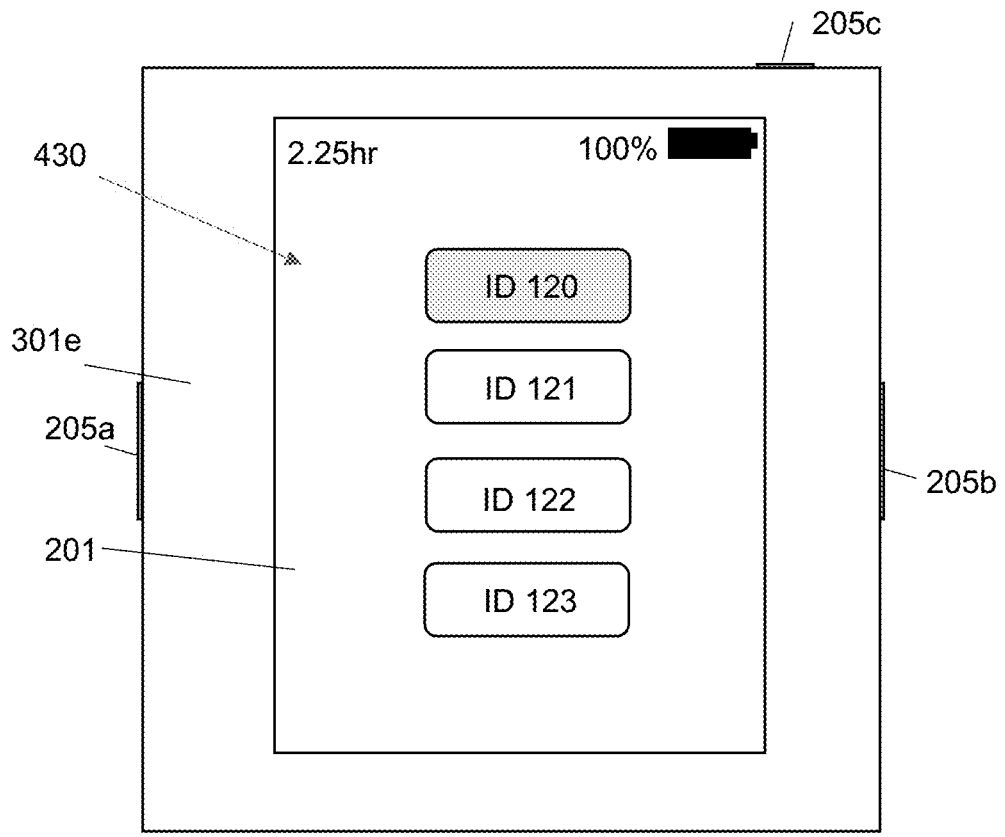
FIG. 4d is an example embodiment of a GUI showing a configuration screen.

FIG. 4d shows an example embodiment of a configuration screen, which includes options for changing from the current beacon ID (e.g. ID 120) to a different beacon ID. This feature helps a user to re-purpose the beacon for tracking another object or person in a very quick manner (e.g. on the fly during a live show or a live production).

Changes to the beacon ID or changes to one or more other settings of the beacon, or both, that are made via the GUI on the beacon, are transmitted to the data network 101 and propagated to a tracking server 103 or to one or more charging stations 110a, 110n, or to both.

Figure 5:
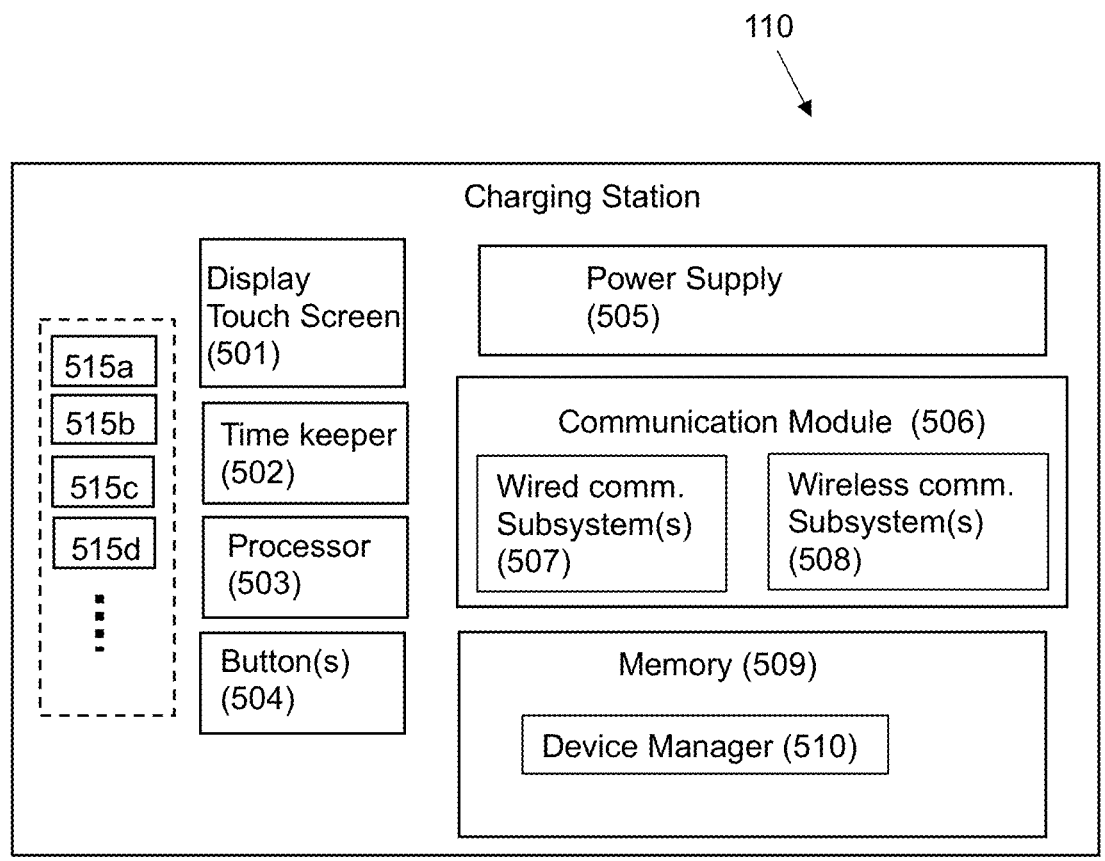
FIG. 5 is a schematic diagram of a charging station according to an example embodiment.

Turning to FIG. 5, example components of a charging station 110 are shown. The charging station 110 includes a display touch screen 501, a time keeper 502, a processor 503, one or more buttons 504, a power supply 505, a communication module 506, memory 509 and one or more charging ports 515a, 515b, 515c, 515d, etc.

The communication module 506 connects to the data network 101 preferably using a wired communication subsystem 507. The wired communication subsystem 507 also facilitates daisy chaining of multiple charging stations. The communication module can include a wireless communication subsystem 508 for connection to the data network 101, either in alternative or in addition to the wired communication subsystem. The memory 509 includes device manager software 510 to monitor, modify and control parameters and settings of the beacons, as well as the charging station itself.

Each of the charging ports 515a, 515b, etc. include one or more connectors that mates with a given beacon to provide power to the given beacon as well as to facilitate data communication with the given beacon.

Figure 6A:
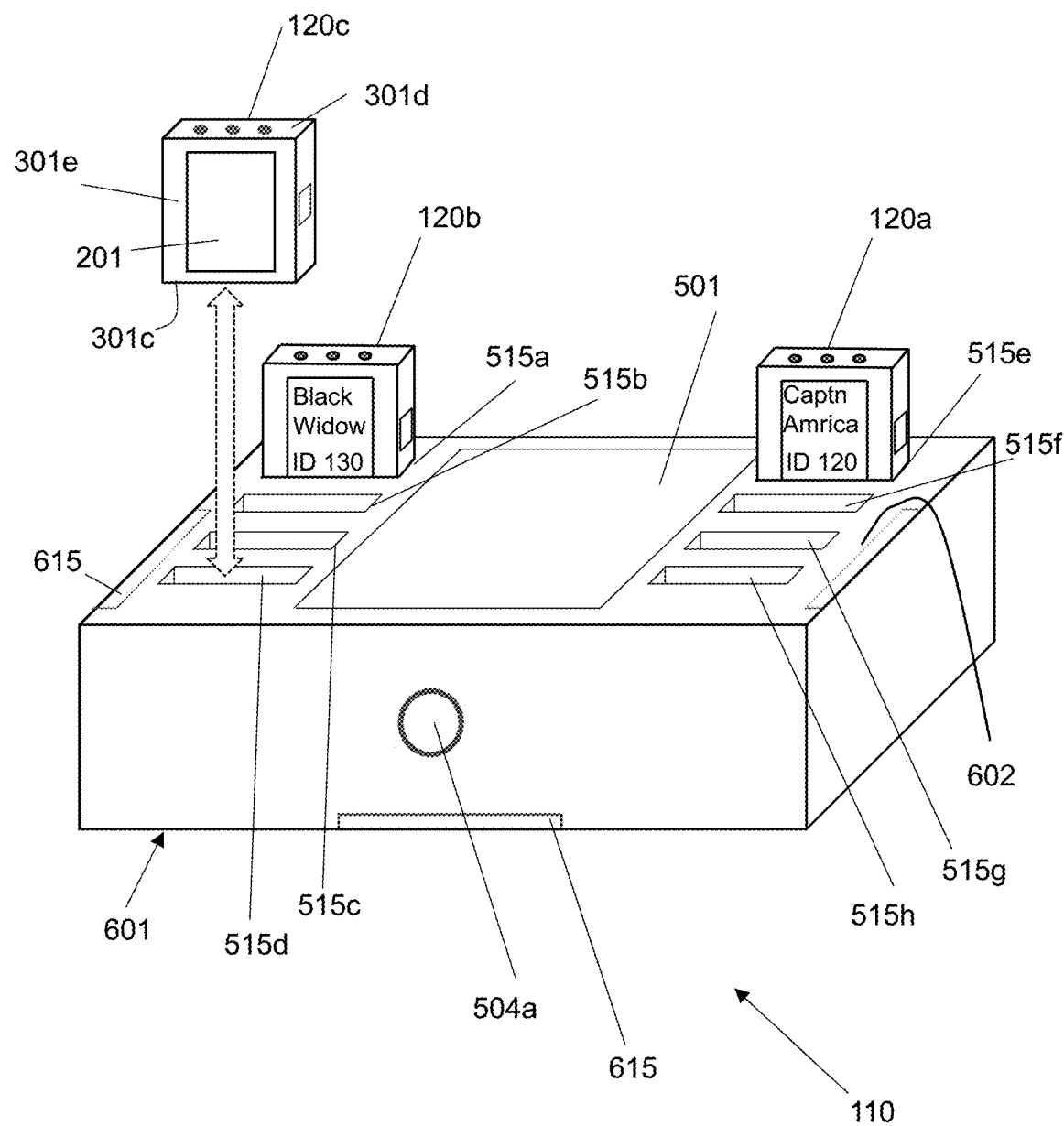
FIG. 6a is a front perspective view of a charging station according to an example embodiment.

Turning to FIG. 6a, an example embodiment of a charging station 110 is shown, which includes a housing 601. The front surface of the housing has thereon a power button 504a. The top surface 602 of the housing has thereon the touch screen display 501 and multiple charging ports 515a, 515b, 515c, 515d, 515e, 515f, 515g, 515h. In this example, eight charging ports are shown, but it will be appreciated that the layout and number of the charging ports can vary. Each charging port includes an indent or a cavity to hold a given beacon in place. One more air vents 615 are also positioned on the housing 601. For example, an air vent is positioned at or near the bottom of the housing, and another air vent is positioned at or near the top of the housing.

In FIG. 6a, the beacon 120a is positioned in the charging port 515e and the display screen on the beacon 120a shows the name Captain America and "ID 120". The beacon 120b is positioned in the charging port 515a and display screen on the beacon 120b shows the name Black Widow and "ID 130". The beacons are insertable and removable from the charging ports.

Using the touch screen display 501 and the device manager software, beacon settings can be monitored and changed.

In an example aspect, the touch screen display 501 is a lighted display (e.g. emits light) so that the GUIs presented on the touch screen display are visible in dark or low-light environments.

Figure 6B:
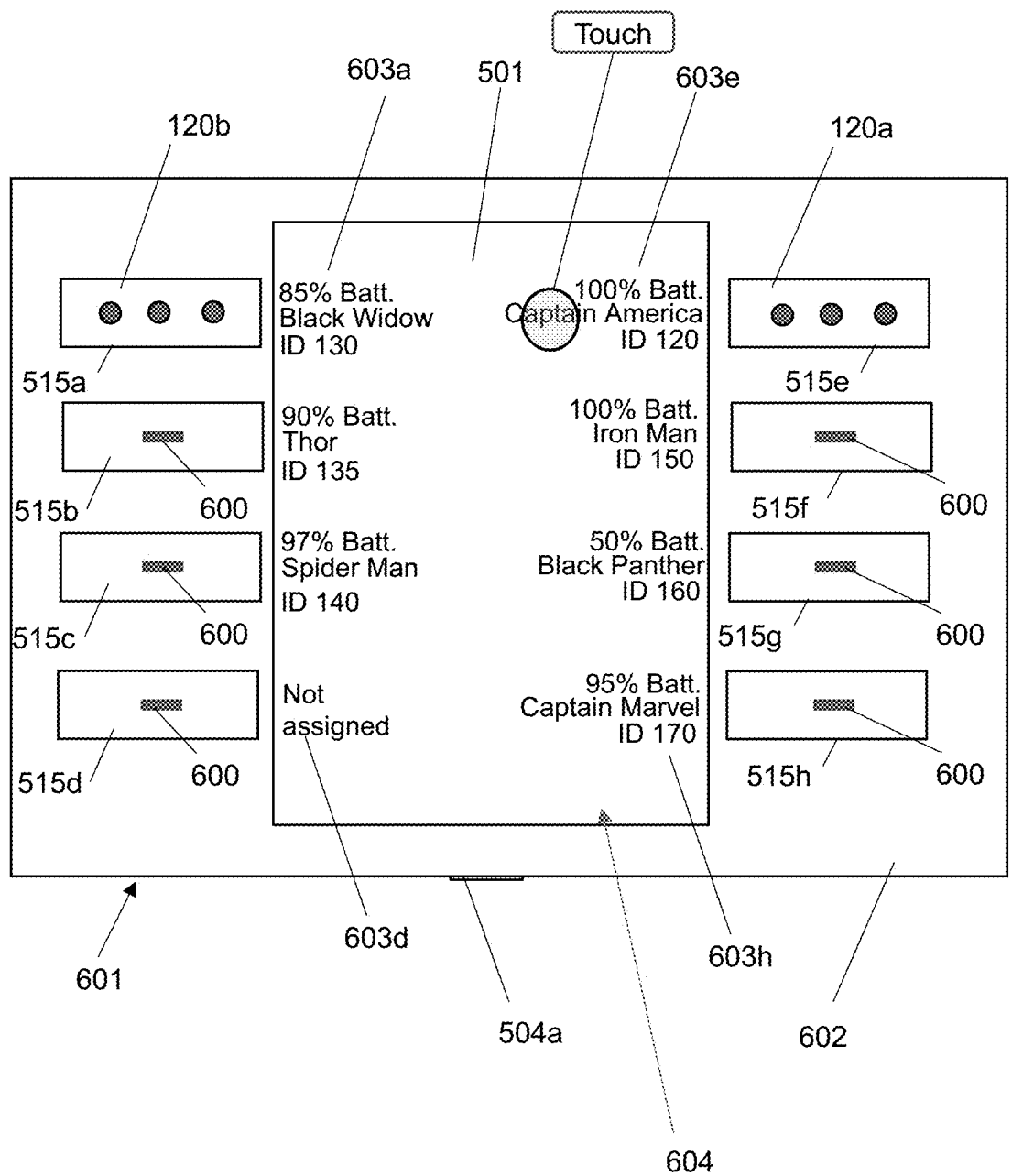
FIG. 6b is a top-down view of the charging station shown in FIG. 6a, and including an example embodiment of a GUI.

In the top-down view of FIG. 6b, the beacons 120b and 120a are shown inserted into the charging ports, while the other charging ports are empty. In each charging port is a connector 600 that provides power and transfers data. The connector 600 connects to the port 302 of a given beacon. In an example embodiment, the connector 600 is a male USB-C connector and the port 302 is a female USB-C connector. It will be appreciated that other types of connectors can be used.

The general status GUI 604 on the screen 501 displays status information associated with each charging port. For example, status information 603a about the charging port 515a is positioned next to the charging port 515a and it includes the battery status of the associated beacon (e.g. beacon 120b in the charging port 515a), the associated name, and the beacon ID. Similar status information 603e is shown in relation to the charging port 515e for the beacon 120a.

Status information 603h is also displayed for a given beacon that is not currently positioned in the charging port 515h. In other words, the charging port 515h is associated with or assigned to a given beacon (e.g. for Captain Marvel having ID 170). The battery information and other status information is wirelessly transmitted from the Captain Marvel beacon to the data network 101 and to the charging station, and this information is used to update the status information 603h.

In another example aspect, the charging port 515d is not assigned to any beacon and the status information 603d shows the same.

Figure 6C:
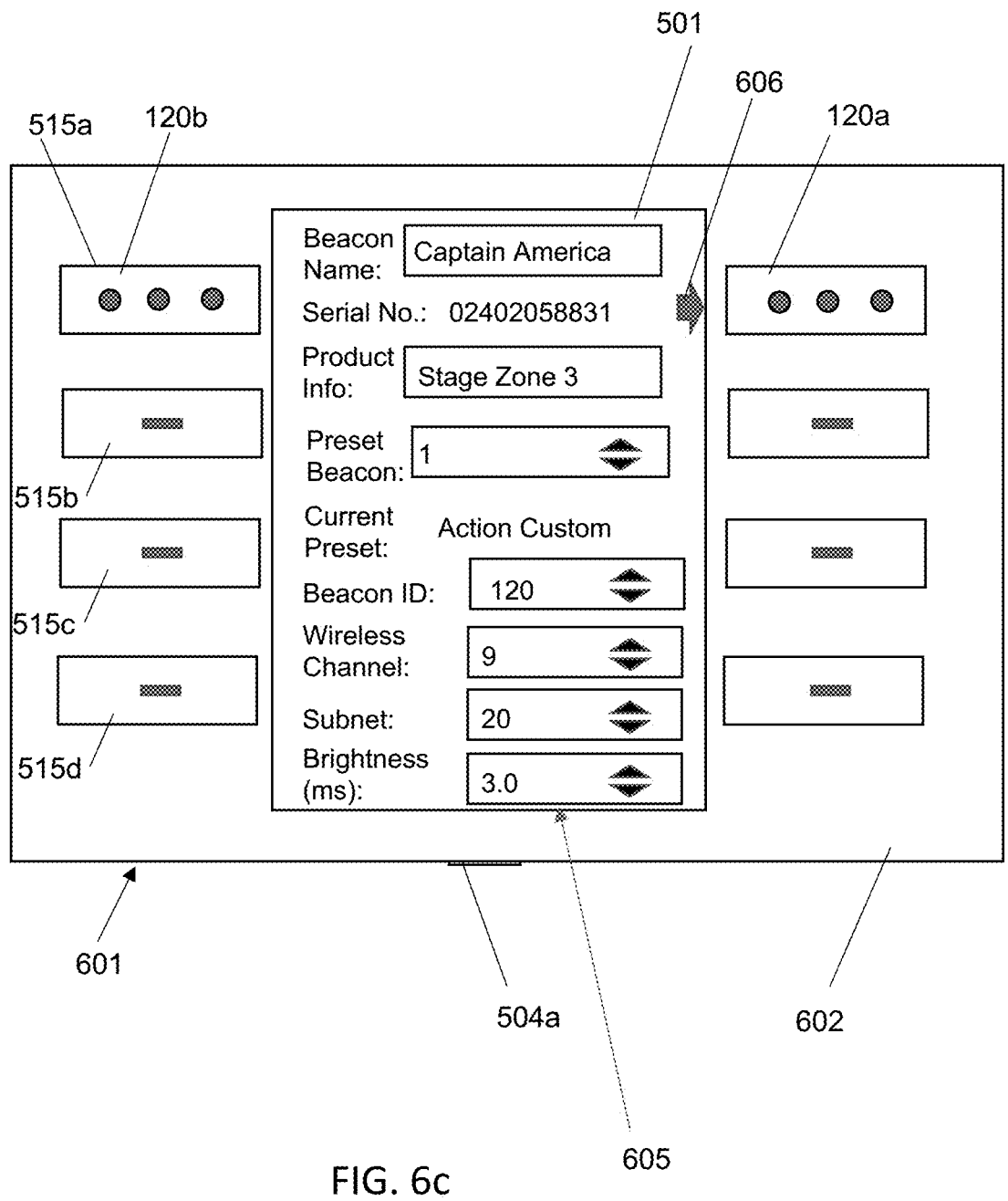
FIG. 6c is a top-down view of the charging station showing a GUI that includes settings for a given beacon.

When the screen 501 detects a touch input over the status information 60e, more information and settings are shown as per the GUI 605 shown in FIG. 6c.

In particular, the GUI 605 shows detailed settings about the beacon associated with Captain America. In an example aspect, an indicator 606 indicates the position of the associated charging port. These settings can be modified using the touch screen display 501. Values, options buttons, numbers, and text can be inputted using various graphical controls. The graphical controls can include a virtual touch-screen keyboard that appears as appropriate (e.g. selecting a text field).

The settings include the beacon name, the product information (e.g. zone information), preset conditions and processes, beacon ID, wireless channel, subnet and light source brightness. These settings are modifiable on the charging station GUI. By modifying one or more of these settings in the GUI, these one or more modified settings are transmitted from the charging station to the beacon, via the charging port. It will be appreciated that these settings are just for example. Other settings can be used in alternative or in addition. The serial number of the beacon is also shown.

Figure 6D:
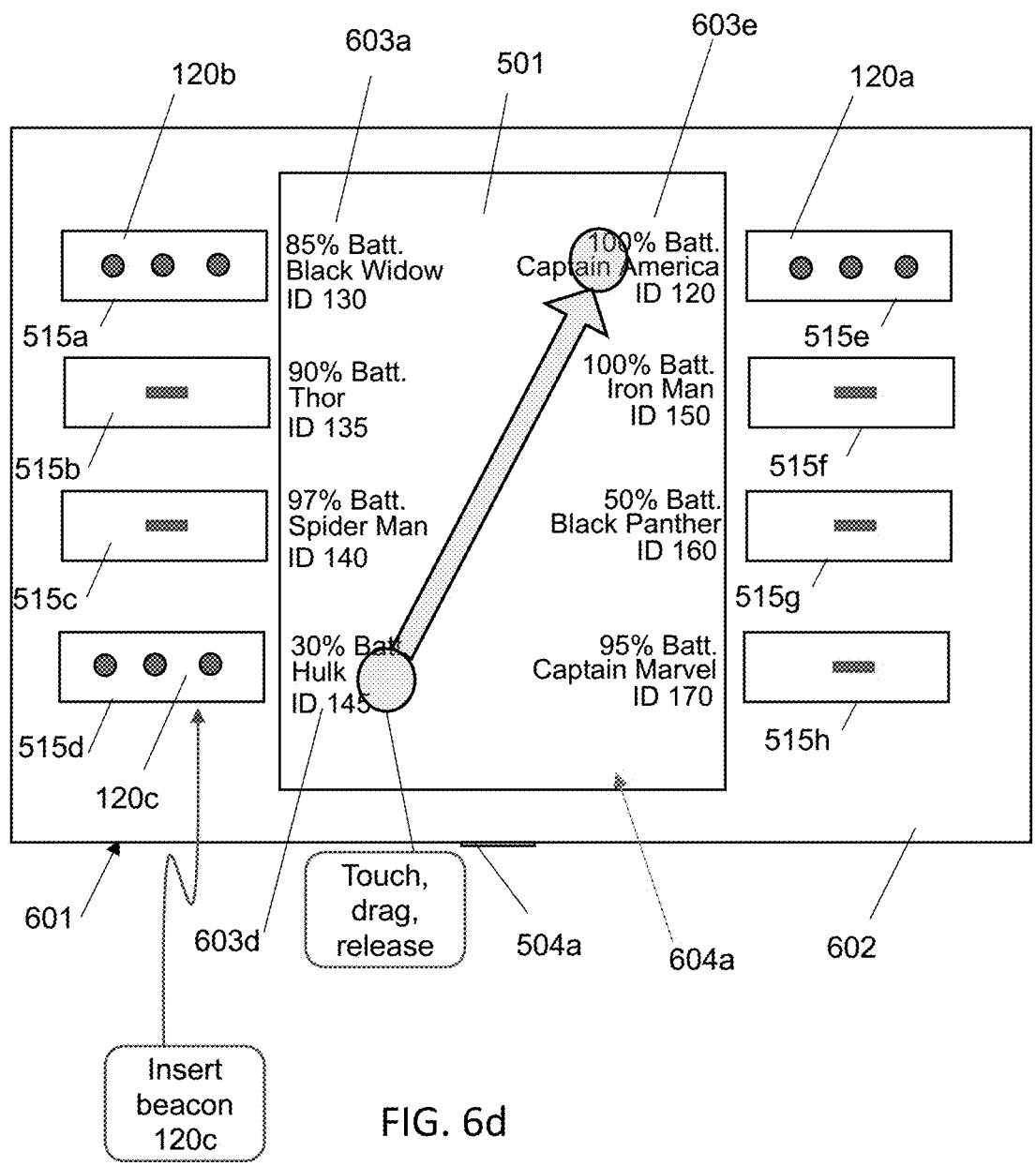
FIG. 6d is a top-down view of the charging station showing a GUI that includes a touch-screen gesture to switch beacon IDs.

Turning to FIG. 6d, an action occurred where the beacon 120c was inserted into the charging port 515d. As a result, charging station automatically detects this action and exchanges information with the beacon 120c. In particular, the charging station obtains status information from the beacon 120c and this information is automatically displayed as status information 603d (e.g. including the battery information, name, and beacon ID) on the screen 501, as per the GUI 604a. In other words, the charging port 515d was initially not assigned to a beacon, and after the beacon 120c was inserted, the charging port 515d was automatically assigned to the beacon 120c.

After the insertion and update of information about the beacon 120c, in this example, the beacon 120c has low power (e.g. 30% battery charge) and is currently assigned to Hulk and has beacon ID 145. For example, an actor for the Hulk however, desires a beacon with full battery charge immediately, while an actor for Captain America is okay to use a beacon with a low battery charge or has time to wait for a battery to charge to full capacity.

The screen 501 detects a user input that includes a touch, drag, and release gesture that starts at the position of the status information 603*d* (by the charging port 515*d*) and ends at the position of the status information 603*e* (by the charging port 515*e*). After detecting this gesture, the charging station automatically switches the beacon ID and associated settings between the beacons 120*c* and 120*a*. The subsequent GUI 604*b* after the gesture is shown in FIG. 6*e*.

Figure 6E:
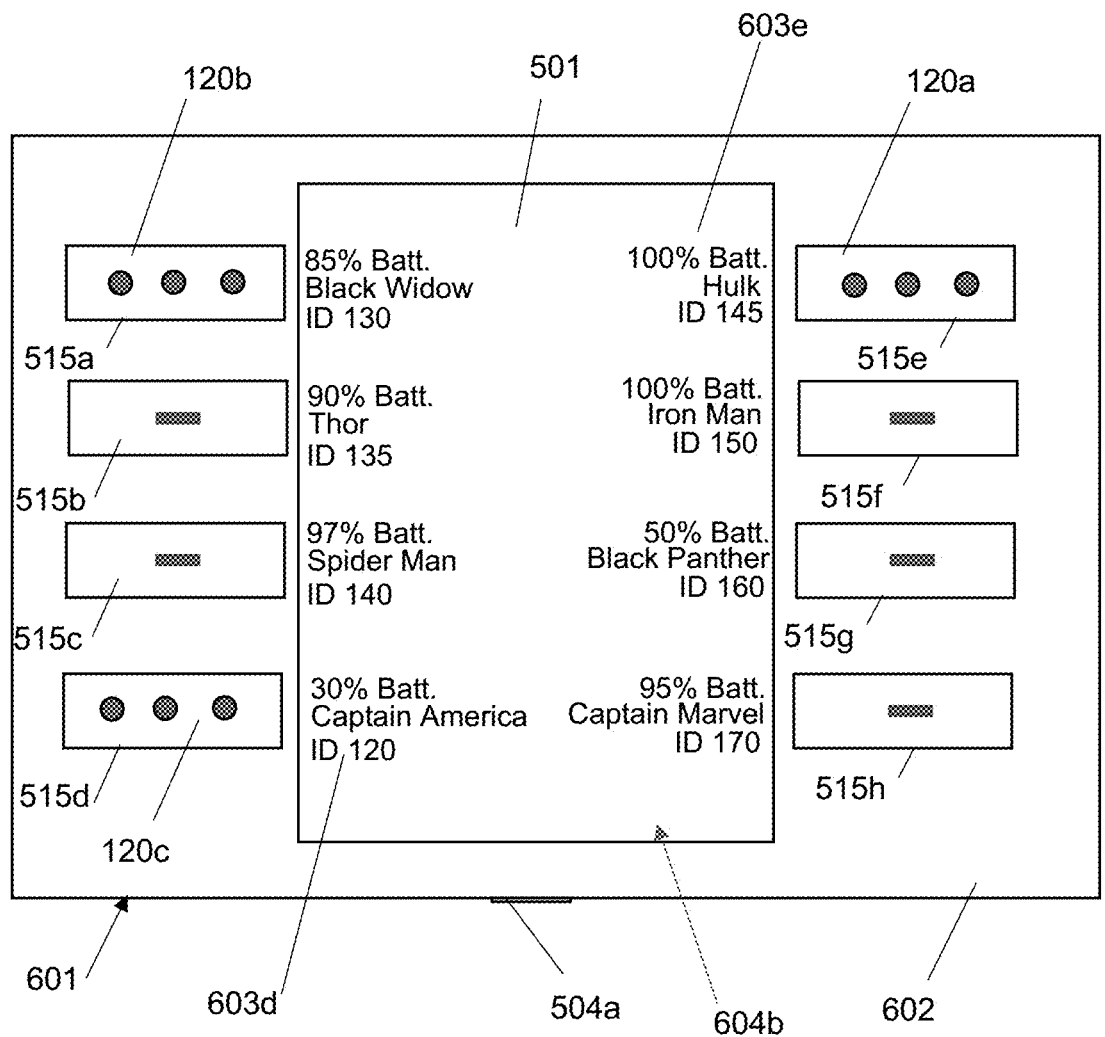
FIG. 6e is a top-down view of the GUI after the touch-screen gesture in FIG. 6d.

In particular, in FIG. 6*e*, the beacon 120*a*, which has full battery charge and is in the charging port 515*e*, now is associated with the name Hulk and beacon ID 145. The beacon 120*c*, which has 30% battery charge and is in the charging port 515*d*, now is associated with the name Captain America and beacon ID 120.

The actor for the Hulk can now take the beacon 120*a*. This allows for a very quick swap of beacons, as well as beacon settings.

It is appreciated that any updates and actions that take place at the charging station can be propagated throughout the system. For example, updated beacon IDs and settings, where applicable, are transmitted from the charging station to one or more of: the tracking server 103; one or more other charging stations; and the relevant beacon(s).

In an example embodiment, the device manager software on the charging station is used to remotely modify a setting of one or more beacons, even if the one or more beacons are not positioned in a charging port on the charging station.

Figure 7:
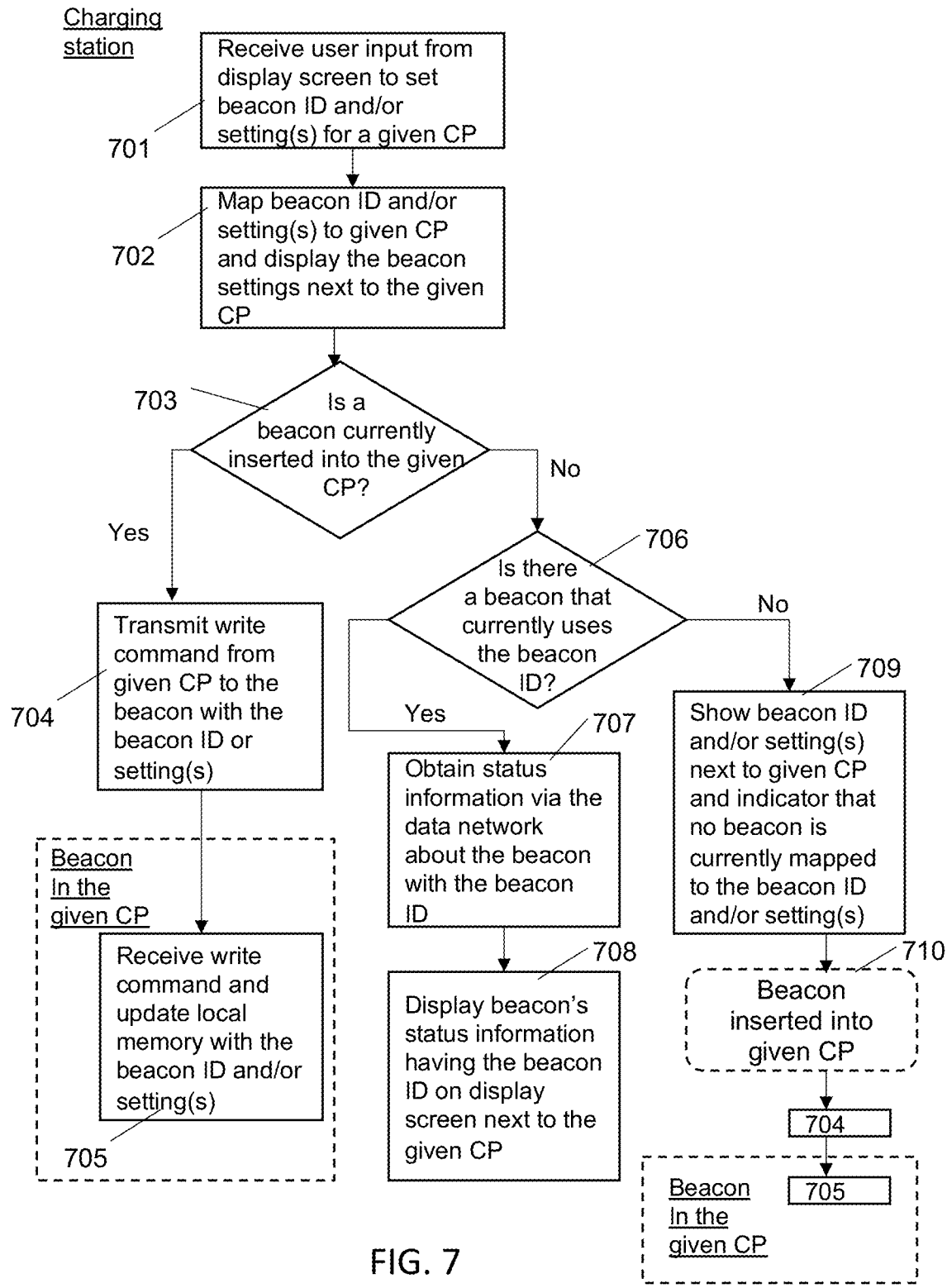
FIG. 7 are executable instructions by the charging station for displaying data and updating the beacon ID or beacon settings, or both, according to an example embodiment.

Turning to FIG. 7, example executable instructions are provided for charging station and its interaction with a beacon.

Block 701: The charging station receives user input via the touch screen to set a beacon ID, or to modify another beacon setting, in association with a given charging port (also referred to as "CP" in FIG. 7). This user input, for example, can be updated via the detailed view as shown in FIG. 6*c*, or can be a swapping gesture in FIG. 6*d*, or some other type of input.

Block 702: The charging station maps the beacon ID or setting(s), or both, to the given charging port and displays the beacon settings next to the given charging port.

Block 703: The charging station determines if a beacon is currently inserted into the given charging port. If so, the process continues to block 704. If not, the process continues to block 706.

Block 704: The charging station transmits a write command from the given charging port to the beacon with the updated beacon ID or updated setting(s), or both.

Block 705: Following block 704, after the beacon in the given charging port receives the write command, the beacon updates its local memory with the updated information.

Block 706: Following block 703, the charging station determines if there is a beacon in the system 100 that currently uses the subject beacon ID. If so, the process continues to block 707. If not, the process continues to block 709.

Block 707: The charging station obtains the status information about the beacon with the beacon ID. This status information is obtained from the data network 101 (e.g. from another charging station, from the beacon itself, from the tracking server, etc.).

Block 708: Following block 707, the charging station displays the beacon's status information having the beacon ID next to the given charging port.

Block 709: If there is no beacon that currently is assigned to the beacon ID (e.g. for a new beacon ID), then the new beacon ID and associated settings are displayed next to the given charging port. The charging station also displays an indicator that the no beacon is currently mapped to the new beacon ID and the related settings.

Action 710: Following block 709, a beacon is inserted into the given charging port.

Following action 710, block 704 and 705 are executed.

Below are general example embodiments.

In an example embodiment, a tracking beacon comprises: an electronic display; a processor; one or more buttons; one or more ports for connecting to and powering one or more infrared light sources; a communication module; a battery; and memory that stores thereon a beacon ID and a corresponding blinking pattern for the one or more infrared lights, and further storing thereon a GUI that is displayed on the electronic display. The GUI displays the beacon ID assigned to the tracking beacon.

In an example aspect, the memory stores multiple beacon IDs that respectively correspond to multiple blinking patterns for controlling the one or more infrared lights, and selection and activation of a given beacon ID and a corresponding given blinking pattern is navigated through the GUI using the one or more buttons.

In another example aspect, the electronic display is an electronic paper display.

In another example aspect, the GUI comprises one or more working indicators positioned on the electronic display in relation to the one or more ports, and wherein a given working indicator indicates if a given infrared light source is connected to a given port and is emitting infrared light.

In another example aspect, the GUI includes a graphical control, which are activated using the one or more buttons, to modify a setting of the tracking beacon.

In another example aspect, the graphical control changes the beacon ID currently associated with the tracking beacon to a new beacon ID, which automatically modifies the blinking pattern to a new blinking pattern of the one or more light infrared light sources.

In another example aspect, after detecting a given one of the one or more buttons is activated, momentarily illuminating the electronic display.

In another example aspect, the tracking beacon further comprises one or more working indicators positioned in corresponding relation to the one or more ports, and, activating a given working indicator corresponding to a given port when the tracking beacon activates a given infrared light source connected to the given port.

In another example aspect, the tracking beacon further comprises a wired communication port that receives power to charge the battery and data from an external device. In another example aspect, via the wired communication port, the tracking beacon receives and stores a new beacon ID and a corresponding new blinking pattern for the one or more infrared light sources.

In another example aspect, the tracking beacon further comprises a barometer, and data from the barometer is transmitted along with a beacon ID using the communication module.

In another example aspect, the tracking beacon further comprises a wired communication port configured to receive power and exchange data; and the wired communication port is connected to an external device that comprises one or more additional infrared light sources that are controllable by the tracking beacon via the wired communication port.

In another example embodiment, a system is provided for charging and interacting with tracking beacons. The system comprises a charging station for charging one or more tracking beacons, and the charging station comprising a housing, a display, one or more charging ports that are configured to each receive a tracking beacon. Each of the one or more tracking beacons comprises a housing, an electronic display, one or more buttons, one or more ports for connecting to and powering one or more infrared lights, a processor, a communication module, memory, a battery, and a wired communication port for connecting to a given charging port of the charging station. A given tracking beacon is connected to the given charging port of the charging station receives power from the charging station, and at least one of sends and receives data to and from the charging station. The data comprises a beacon ID and a corresponding blinking pattern for the one or more infrared lights.

In an example aspect, the given tracking beacon receives time synchronization data from the charging station via the wired communication port.

In another example aspect, the charging station comprises multiple charging ports that are positioned at one or more edges of the display, and the display shows beacon IDs positioned beside and corresponding to each of the charging ports.

In another example aspect, after the given tracking beacon is removed from the given charging port, the given tracking beacon wirelessly transmits status data to the charging station, and the status data is shown on the display of the charging station.

In another example aspect, after the given tracking beacon is removed from the given charging port, the charging station receives an input to change a setting of the given tracking beacon, the charging station wirelessly transmits settings data to the given tracking beacon, and the given tracking beacon changes the setting using the settings data. In another example aspect, the input is user input received via a graphical user interface shown by the display of the charging station.

In another example aspect, the beacon ID is stored and displayed on the tracking beacon, and after it is connected to the given charging port, the beacon ID is automatically transmitted to the charging station and displayed on the display of the charging station.

In another example embodiment, a charging station for charging tracking beacons is provided. The charging station comprises: a housing that comprises a touch screen display and charging ports that are configured to each receive a tracking beacon; a processor; a power supply; a communication module; and memory comprising device manager software, the device manager software including a GUI that is displayed on the touch screen display. The charging station receives user inputs via the GUI configured to update one or more settings of a given tracking beacon.

In an example aspect, each of the charging ports are positioned close to any edge of the touch screen display.

In another example aspect, a beacon setting update is made via the GUI in relation to an empty charging port and, after the given tracking beacon is inserted into the empty charging port, the given tracking beacon is automatically updated with the beacon setting update.

In another example aspect, the charging station further comprises a time keeping device, and the charging station transmits time synchronization data from the time keeping device via one or more of the charging ports.

In another example aspect, a first beacon ID is displayed beside a first charging slot and a second beacon ID is displayed beside a second charging slot, and responsive to receiving a touch gesture to switch positions between the first beacon ID with the second beacon ID, the charging station updates the touch screen display to show the first beacon ID beside the second slot and the second beacon ID beside the first slot.

In another example embodiment, a tracking beacon includes: an electronic paper display; a processor; one or more buttons; one or more ports for connecting to and powering one more light sources; a communication module; a battery; and memory that comprises a GUI that is displayed on the electronic paper display, and the GUI is navigated using the one or more buttons.

In an example aspect, the GUI comprises one or more working indicators positioned in relation to the one or more ports, and wherein a given working indicator indicates if a given light source is connected to a given port and is emitting light.

In another example aspect, the GUI includes a graphical control, which are activated using the one or more buttons, to modify a setting of the beacon.

In another example embodiment, a tracking beacon includes: a housing that comprises a display, one or more buttons, and ports for connecting to and powering one more light sources, each of the ports positioned close to any edge of the display; a processor; a communication module; a battery; and memory that comprises a GUI that is displayed on the display. The GUI is navigated using the one or more buttons, and wherein the GUI comprises one or more working indicators positioned on the display in relation to positions of the ports. A given working indicator indicates if a given light source is connected to a given port and is emitting light.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, EEPROM, flash memory or other memory technology, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the servers or computing devices or nodes, or accessible or connectable thereto. Any application or module herein described may be implemented using computer readable/executable instructions that may be stored or otherwise held by such computer readable media.

It will be appreciated that different features of the example embodiments of the system, the devices, and the components as described herein, may be combined with each other in different ways. In other words, different devices, modules, operations, functionality and components may be used together according to other example embodiments, although not specifically stated.

It will also be appreciated that the examples and corresponding system diagrams used herein are for illustrative purposes only. Different configurations and terminology can be used without departing from the principles expressed herein. For instance, components and modules can be added, deleted, modified, or arranged with differing connections without departing from these principles.

Although the above has been described with reference to certain specific embodiments, various modifications thereof will be apparent to those skilled in the art without departing from the scope of the claims appended hereto.

The invention claimed is:

1. A kit of parts comprising a tracking beacon and an external device, wherein the tracking beacon comprises:
   an electronic display;
   a processor;
   one or more buttons;
   one or more ports for connecting to and powering one or more infrared light sources;
   a wired communication subsystem configured to communicate with a charging station while physically connected to the charging station and to communicate with the external device while physically connected to the external device,
   a wireless communication subsystem configured to wirelessly communicate with the charging station while positioned away from the charging station;
   a battery;
   a memory that stores thereon a graphical user interface (GUI) that is displayed on the electronic display and that is navigable using the one or more buttons;
   the wireless communication subsystem is further configured to wirelessly receive an updated setting comprising an updated beacon ID, the updated setting transmittable by the charging station, and the tracking beacon is further configured to change to the updated beacon ID including a corresponding updated blinking pattern of the one or more infrared light sources; and
   the external device is operable to be connected to the tracking beacon via the wired communication subsystem, and the external device comprises a plurality of ports connected to respectively to a plurality of additional infrared light sources; and
   wherein the tracking beacon is configured to selectively activate at least a given one of the plurality ports to pulse a corresponding given one of the plurality of additional infrared light sources.

2. The kit of parts of claim 1 wherein the tracking beacon comprises a plurality of ports; the electronic display displays the GUI that comprises an associated name of the tracking beacon, the updated beacon ID, and a plurality of identifications for the plurality ports; and wherein one or more of the plurality of identifications on the GUI visually indicate that one or more of the plurality of ports are connected to the one or more infrared light sources.

3. The kit of parts of claim 1 wherein the GUI comprises one or more working indicators positioned on the electronic display in relation to the one or more ports, and wherein a given working indicator indicates if a given infrared light source is connected to a given port and is emitting infrared light.

4. The kit of parts of claim 1 wherein the GUI includes a graphical control, which is activated using the one or more buttons, to modify a light source brightness setting of the tracking beacon, wherein the light source brightness setting sets a brightness level of the one or more infrared light sources.

5. The kit of parts of claim 1 wherein the updated setting, which is transmittable by the charging station, further comprises an updated light source brightness setting, and the tracking beacon changes the one or more infrared light sources to blink at a brightness level according to the updated light source brightness setting.

6. The kit of parts of claim 1 wherein, after detecting a given one of the one or more buttons is activated, momentarily illuminating the electronic display.

7. The kit of parts of claim 1 further comprising one or more working indicators positioned in corresponding relation to the one or more ports, and, activating a given working indicator corresponding to a given port when the tracking beacon activates a given infrared light source connected to the given port.

8. The kit of parts of claim 1 wherein the external device provides power to charge the battery of the tracking beacon while connected together.

9. The kit of parts of claim 1 wherein the external deice obtains power from the battery of the tracking beacon while connected together.

10. The kit of parts of claim 1 wherein the tracking beacon further comprises a barometer.

11. The kit of parts of claim 1 wherein the external device further comprises a plurality of visual indicator devices corresponding to the plurality of additional ports on the external device, and a given one of the visual indicator devices corresponding to the given one of the plurality of ports is activated when the given one of plurality of ports is activated by the tracking beacon.

12. The kit of parts of claim 1, wherein the tracking beacon is configured to wirelessly transmit a status data that is receivable by the charging station, and wherein the status information comprises a battery status.

13. The kit of parts of claim 1, wherein the external device comprises a wireless communication system that increases a distance at which the tracking beacon wirelessly receives or transmits data while connected to the tracking beacon.

14. The kit of parts of claim 1, wherein the external device is configured to sense additional data and provide the additional data to the tracking beacon while connected to the tracking beacon.

* * * * *